United States Patent
Lin

(10) Patent No.: US 12,276,524 B2
(45) Date of Patent: Apr. 15, 2025

(54) AIRCRAFT FLIGHT ATTITUDE DISPLAY DEVICE

(71) Applicant: Hung-Hsin Lin, Taipei (TW)

(72) Inventor: Hung-Hsin Lin, Taipei (TW)

( * ) Notice: Subject to any disclaimer, the term of this patent is extended or adjusted under 35 U.S.C. 154(b) by 243 days.

(21) Appl. No.: 17/852,394

(22) Filed: Jun. 29, 2022

(65) Prior Publication Data

US 2022/0341754 A1 Oct. 27, 2022

Related U.S. Application Data

(63) Continuation-in-part of application No. 16/879,789, filed on May 21, 2020, now abandoned.

(30) Foreign Application Priority Data

Jun. 4, 2019 (TW) ................. 108119397

(51) Int. Cl.
| | |
|---|---|
| *G01C 23/00* | (2006.01) |
| *B64D 43/02* | (2006.01) |
| *G06F 3/04845* | (2022.01) |
| *G08G 5/21* | (2025.01) |

(52) U.S. Cl.
CPC ........... *G01C 23/005* (2013.01); *B64D 43/02* (2013.01); *G06F 3/04845* (2013.01); *G08G 5/21* (2025.01)

(58) Field of Classification Search
CPC ... G01C 23/005; B64D 43/02; G06F 3/04845; G08G 5/0021
USPC .......................................................... 701/3
See application file for complete search history.

(56) References Cited

U.S. PATENT DOCUMENTS

| | | | |
|---|---|---|---|
| 3,327,407 A | 6/1967 | Barnes | |
| 4,563,742 A * | 1/1986 | McElreath | G01C 19/32 340/975 |
| 5,978,715 A | 11/1999 | Briffe et al. | |
| 6,931,368 B1 * | 8/2005 | Seifert | G01C 23/005 434/51 |
| 8,965,601 B1 * | 2/2015 | Barber | G01C 23/005 340/975 |
| 9,222,800 B1 * | 12/2015 | Scherer | G08G 5/0021 |
| 9,989,378 B2 * | 6/2018 | Vernaleken | G01C 23/00 |
| 2009/0319098 A1 * | 12/2009 | Raje | G01C 23/00 701/3 |

(Continued)

FOREIGN PATENT DOCUMENTS

| | | | | |
|---|---|---|---|---|
| CN | 104828253 A | | 8/2015 | |
| EP | 2072956 A2 * | | 6/2009 | ........... G01C 23/005 |
| EP | 3239053 B1 | | 10/2018 | |

(Continued)

OTHER PUBLICATIONS

Machine translation of FR-3009414-A1 (Year: 2015).*

(Continued)

*Primary Examiner* — Hussein Elchanti
*Assistant Examiner* — Kenneth M Dunne

(57) ABSTRACT

An aircraft flight attitude display device includes a central processing unit (CPU), a display unit electrically connected to the CPU for showing an aircraft image therein, a flight data receiver unit electrically connected to the CPU, a sky obstacle data receiver unit electrically to the CPU, a ground obstacle data receiver unit electrically connected to the CPU, and a power supply unit electrically connected to the CPU.

2 Claims, 5 Drawing Sheets

(56) References Cited

U.S. PATENT DOCUMENTS

2016/0004374 A1     1/2016  Kneuper et al.
2017/0038223 A1 *   2/2017  Toumazet .............. B64D 45/00

FOREIGN PATENT DOCUMENTS

| FR | 3009414 A1 * | 2/2015 | ........... G01C 23/005 |
|---|---|---|---|
| GB | 2107059 A * | 4/1983 | ........... G01C 23/005 |
| WO | WO-9527186 A1 * | 10/1995 | ........... G01C 23/005 |
| WO | WO-2014081337 A1 * | 5/2014 | ........... G01C 23/005 |
| WO | 2017/021414 A1 | 2/2017 | |

OTHER PUBLICATIONS

Machine translation of WO-2014081337-A1 (Year: 2014).*
Grunwald, "Tunnel Display for Four-Dimensional Fixed-Wing Aircraft Approaches", 1984, AIAA.org (Year: 1984).*

* cited by examiner

AIRCRAFT FLIGHT ATTITUDE DISPLAY DEVICE

CROSS-REFERENCE TO RELATED APPLICATION

This application is a continuation-in-part patent application of U.S. application Ser. No. 16/879,789 filed on May 21, 2020, the entire contents of which are hereby incorporated by reference for which priority is claimed under 35 U.S.C. § 120.

BACKGROUND OF THE INVENTION

1. Field of the Invention

The present disclosure relates to an aircraft flight attitude display device, and in particular to an aircraft flight attitude display device that upgrades the aviation safety by aiding a pilot in making quick and collect judgment about the aircraft flight attitude relative to the sky and the ground.

2. Description of the Related Art

Conventionally, a pilot operating an aircraft requires windshields and numerous instruments to make correct judgment about the flight attitude of the aircraft relative to the sky and the ground, and the judgment involves very complicate procedures. In the event the aircraft encounters an emergency, the pilot tends to suffer spatial disorientation due to the complex judgment procedures and makes errors in operating the aircraft, which finally leads to an aviation accident. It is therefore tried by the inventor to develop an aircraft flight attitude display device that can aid the pilot in making quick and correct judgment about the flight attitude of the aircraft relative to the sky and the ground, so as to upgrade the aviation safety.

BRIEF SUMMARY OF THE INVENTION

A primary objective of the present disclosure is to overcome the disadvantages in the prior art and upgrade the aviation safety by developing an aircraft flight attitude display device capable of aiding a pilot in making quick and correct judgment about the aircraft flight attitude relative to the sky and the ground.

To achieve at least the above objective, the present disclosure provides an aircraft flight attitude display unit that includes a central processing unit (CPU), a display unit, a sky obstacle data receiver unit, a ground obstacle data receiver unit, a flight data receiver unit, and a power supply unit. The display unit is electrically connected to the CPU for showing an aircraft image, which includes a fuselage image, two wing images, two flap images, two spoiler images, two aileron images, a vertical stabilizer image, a rudder image, two horizontal stabilizer images, two elevator images and at least one engine image. The sky obstacle data receiver unit is electrically connected to the CPU for receiving a sky obstacle data, so that at least one sky obstacle image is shown in an upper area of the display unit. The ground obstacle data receiver unit is electrically connected to the CPU for receiving a ground obstacle data, so that at least one ground obstacle image is shown in a lower area of the display unit. The flight data receiver unit is electrically connected to the CPU and includes a pitch angle receiver, a roll angle receiver and a yaw angle receiver. The pitch angle receiver serves to receive a pitch angle data, so that a pitch angle value is shown in the display unit on the aircraft image, and the aircraft image shown in the display unit is in a flight attitude corresponding to the pitch angle value. The roll angle receiver serves to receive a roll angle data, so that a roll angle value is shown in the display unit on the aircraft image, and the aircraft image shown in the display unit is in a flight attitude corresponding to the roll angle value. The yaw angle receiver serves to receive a yaw angle data, so that a yaw angle value is shown in the display unit on the aircraft image, and the aircraft image shown in the display unit is in a flight attitude corresponding to the yaw angle value. The power supply unit is electrically connected to the CPU.

In an embodiment, the flight data receiver unit includes a flight direction receiver, a flight speed receiver, a flight height receiver, a flight power receiver, a flap angle receiver, a spoiler angle receiver, an aileron angle receiver, a rudder angle receiver, an elevator angle receiver, an autopilot state receiver, and a weather data receiver. The flight direction receiver serves to receive a flight direction data, so that a flight direction value is shown in the display unit on the aircraft image; the flight speed receiver serves to receive a flight speed data, so that a flight speed value is shown in the display unit on the aircraft image; the flight height receiver serves to receive a flight height data, so that a flight height value is shown in the display unit on the aircraft image; the flight power receiver serves to receive a flight power data, so that a flight power value or a reverse thrust value is shown in the display unit on the engine image; the flap angle receiver serves to receive two flap angle data, so that two flap angle values are shown in the display unit on the flap images; the spoiler angle receiver serves to receive two spoiler angle data, so that two spoiler angle values are shown in the display unit on the two spoiler images; the aileron angle receiver serves to receive two aileron angle data, so that two aileron angle values are shown in the display unit on the two aileron images; the rudder angle receiver serves to receive a rudder angle data, so that a rudder angle value is shown in the display unit on the rudder image; the elevator angle receiver serves to receive two elevator angle data, so that two elevator angle values are shown in the display unit on the two elevator images; the autopilot state receiver serves to receive an autopilot state data, so that an autopilot state image is shown in the display unit on the aircraft image; and the weather data receiver serves to receive a weather data, so that a weather state image is shown in the display unit.

In an embodiment, the pitch angle value is shown on the fuselage image, the roll angle value is shown on the fuselage image, and the yaw angle value is also shown on the fuselage image.

In an embodiment, the pitch angle value is shown in the display unit along with a pitch-angle symbol or a pitch-angle unit; the roll angle value is shown in display unit along with a roll-angle symbol or a roll-angle unit; and the yaw angle value is shown in the display unit along with a yaw-angle symbol or a yaw-angle unit.

In an embodiment, the flight direction value is shown on the fuselage image, the flight speed value is shown on the fuselage image, the flight height value is shown on the fuselage image, and the autopilot state image is also shown on the fuselage image.

In an embodiment, the flight direction value is shown in the display unit along with a flight-direction symbol or a flight-direction unit; the flight speed value is shown in the display unit along with a flight-speed symbol or a flight-speed unit; the flight height value is shown in the display unit along with a flight-height symbol or a flight-height unit;

the flight power value is shown in the display unit along with a flight-power symbol or a flight-power unit; the reverse thrust value is shown in the display unit along with a reverse-thrust symbol or a reverse-thrust unit; each of the two flap angle values is shown in the display unit along with a flap-angle symbol or a flap-angle unit; each of the two spoiler angle values is shown in the display unit along with a spoiler-angle symbol or a spoiler-angle unit; each of the two aileron angle values is shown in the display unit along with an aileron-angle symbol or an aileron-angle unit; the rudder angle value is shown in the display unit along with a rudder-angle symbol or a rudder-angle unit; and each of the two elevator angle values is shown in the display unit along with an elevator-angle symbol or an elevator-angle unit.

In an embodiment, the aircraft image further includes a front landing-gear image and two main landing-gear images, and the flight data receiver unit further includes a front landing-gear folding/opening receiver and a main landing-gear folding/opening receiver. The front landing-gear folding/opening receiver serves to receive a front landing-gear folding/opening data, so that the front landing-gear image is hidden/visible in the display unit, respectively; and the main landing-gear folding/opening receiver serves to receive a main landing-gear folding/opening data, so that the main landing-gear images are hidden/visible in the display unit, respectively.

In an embodiment, the aircraft flight attitude display device further includes an aircraft image view-angle selection unit, which is electrically connected to the CPU.

With the above-described arrangements, the aircraft flight attitude display device of the present disclosure can upgrade the aviation safety by aiding a pilot in making quick and correct judgment about the aircraft flight attitude relative to the sky and the ground.

DETAILED DESCRIPTION OF THE INVENTION

To facilitate understanding of the object, characteristics and effects of this present disclosure, embodiments together with the attached drawings for the detailed description of the present disclosure are provided.

Figure 1:
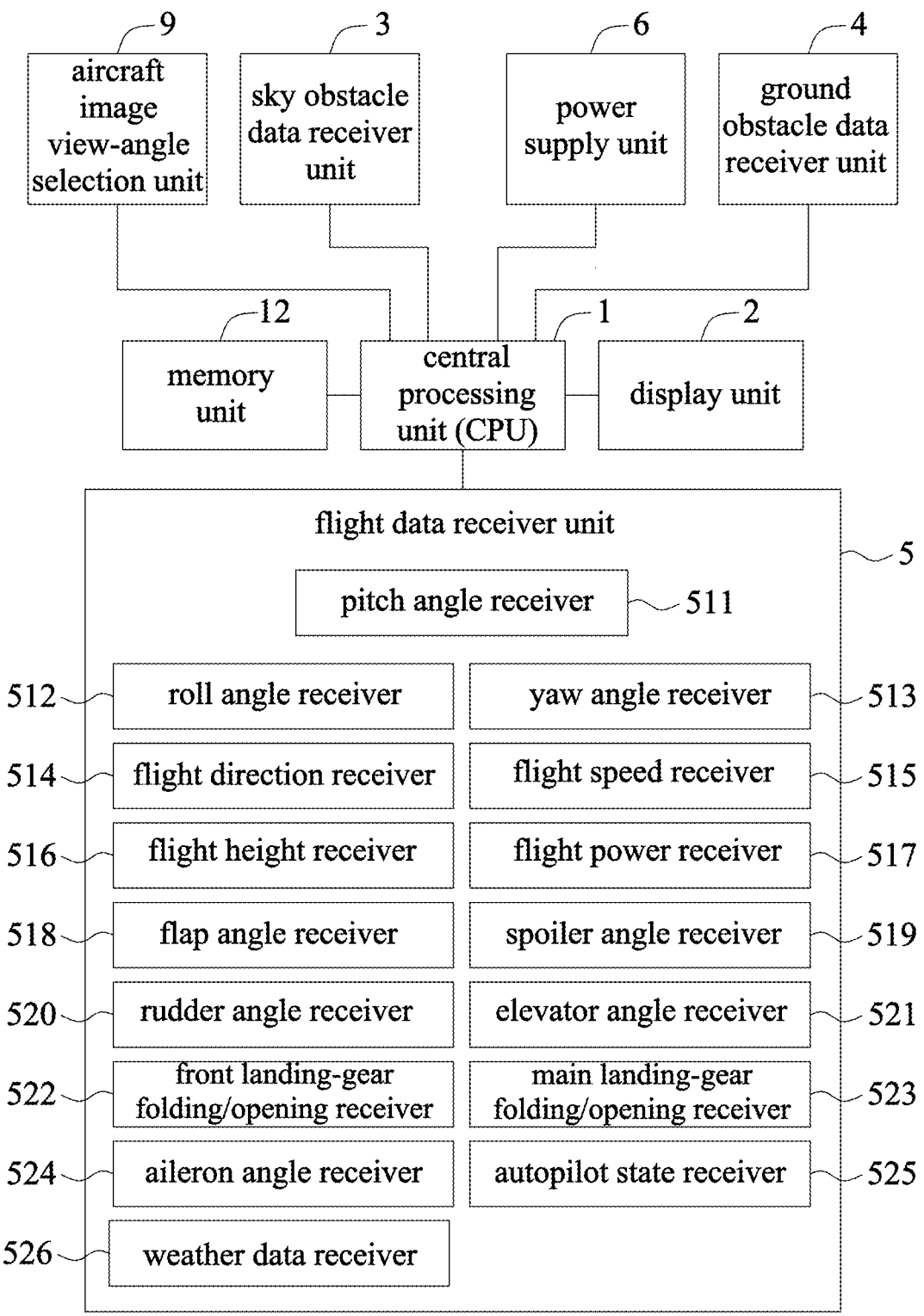
FIG. 1 is a block diagram of an aircraft flight attitude display device according to a preferred embodiment of the present disclosure.
Figure 2:
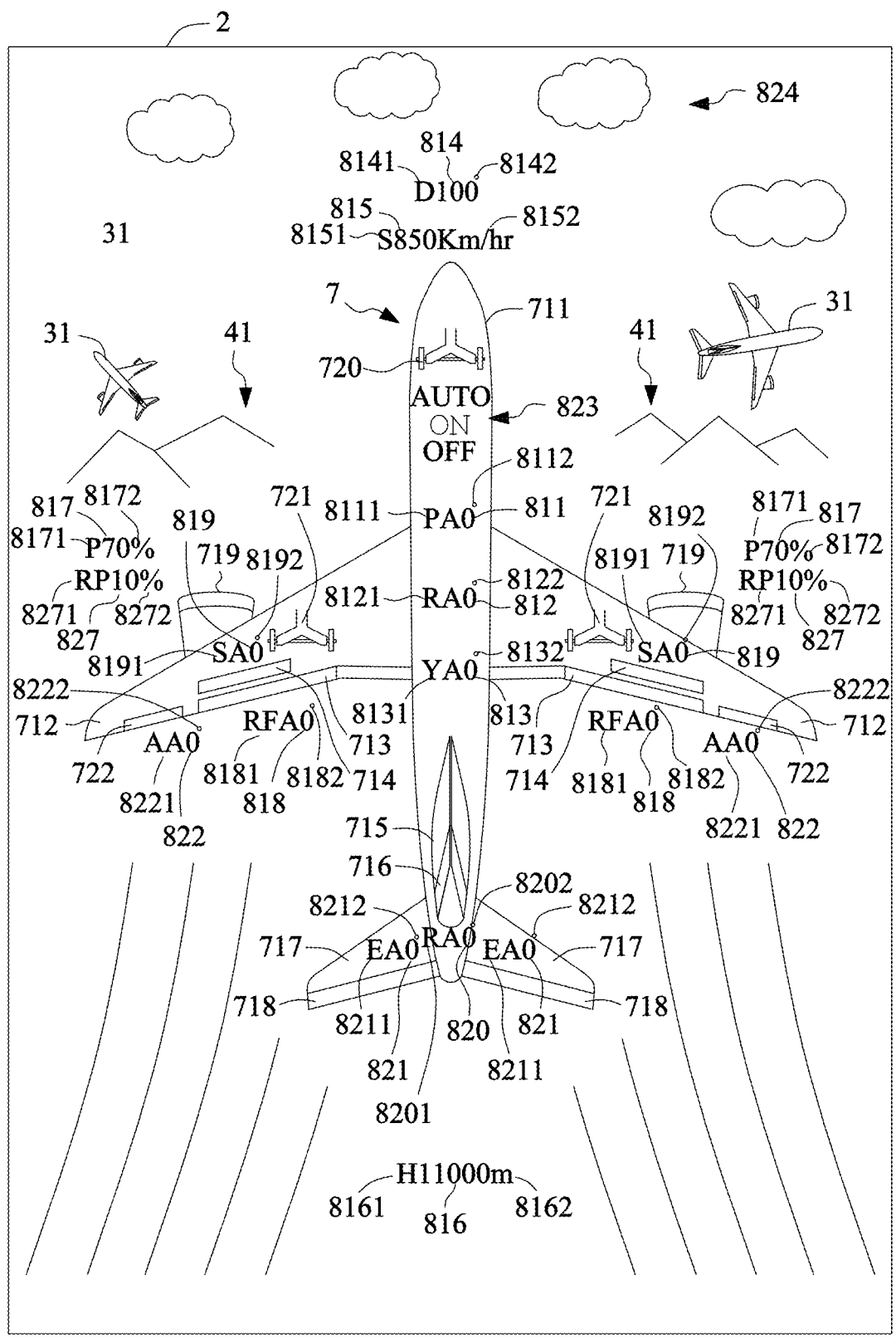
FIG. 2 is an exemplified view of a display unit included in the aircraft flight attitude display device according to the preferred embodiment of the present disclosure shown in FIG. 1.

Please refer to FIGS. 1 and 2. The present disclosure provides an aircraft flight attitude display device, which includes a central processing unit (CPU) 1, a display unit 2, a sky obstacle data receiver unit 3, a ground obstacle data receiver unit 4, a flight data receiver unit 5, and a power supply unit 6. The CPU 1 can be a central processor and it functions to receive, process (i.e. compute) and transfer data, The CPU 1 includes a memory unit 12, which can be a memory, a solid-state drive (SSD), an ordinary drive or a flash drive for temporarily storing data being processed or permanently storing preset data. The display unit 2 can be a flat-panel display such as a liquid-crystal display (LCD) or a light-emitted display (LED), or a curved display such as a curved LCD or a curved LED, or a projector display. The display unit 2 is electrically connected to the CPU 1 and shows an aircraft image 7 therein, such as an airplane image. The aircraft image 7 includes a fuselage image 711, two wing images 712, two flap images 713, two spoiler images 714, two aileron images 722, a vertical stabilizer image 715, a rudder image 716, two horizontal stabilizer images 717, two elevator images 718, and at least one engine image 719. The engine image 719 can be a turbine engine image or a propeller engine image. In the case of the turbine engine image, it can be located below the wing images 712 or at a tail portion of the fuselage image 711. On the other hand, in the case of the propeller engine image, it can be located below the wing images 712 or at a head portion of the fuselage image 711. The sky obstacle data receiver unit 3 can be a chip or a circuit, and is electrically connected to the CPU 1 for receiving a sky obstacle data from, for example, a traffic collision avoidance system (TCAS) or a Doppler radar mounted on the aircraft, so that at least one sky obstacle image 31 such as a simulated aircraft image is shown in an upper area of the display unit 2. The ground obstacle data receiver unit 4 can be a chip or a circuit and is electrically connected to the CPU 1 for receiving a ground obstacle data from, for example, a ground obstacle radar on the aircraft, so that at least one ground obstacle image 41 such as a simulated mountain or river image is shown in a lower area of the display unit 2. The flight data receiver unit 5 is electrically connected to the CPU 1 and includes a pitch angle receiver 511 that can be a chip or a circuit, a roll angle receiver 512 that can be a chip or a circuit, and a yaw angle receiver 513 that also can be a chip or a circuit. The pitch angle receiver 511 serves to receive a pitch angle data from, for example, a pitch sensor on the aircraft, so that a pitch angle value 811 is shown in the display unit 2 on or near the aircraft image 7. It is noted the aircraft image 7 shown in the display unit 2 is in a flight attitude corresponding to the pitch angle value 811. The roll angle receiver 512 serves to receive a roll angle data from, for example, a roll angle sensor on the aircraft, so that a roll angle value 812 is shown in the display unit 2 on or near the aircraft image 7. It is noted the aircraft image 7 shown in the display unit 2 is in a flight attitude corresponding to the roll angle value 812. The yaw angle receiver 513 serves to receive a yaw angle data from, for example, a yaw angle sensor on the aircraft, so that a yaw angle value 813 is shown in the display unit 2 on or near the aircraft image 7. It is noted the aircraft image 7 shown in the display unit 2 is in a flight attitude corresponding to the yaw angle value 813. The power supply unit 6 can be a primary battery, a secondary battery or a power source on the aircraft, and is electrically connected to the CPU 1 for supplying necessary power to all units included in the aircraft flight attitude display device of the present disclosure.

As described above, the aircraft flight attitude display device of the present disclosure includes the display unit 2 for showing the aircraft image 7 that indicates the actual flight attitudes of the aircraft, including take-off, landing, sideward flight, rolling, etc., so that a pilot can quickly and correctly judge the flight attitude of the aircraft relative to the sky and the ground and correctly operates the aircraft to ensure upgraded aviation safety.

As can be seen in FIGS. 1 and 2, according to a preferred embodiment of the present disclosure, the flight data receiver unit 5 may further include a flight direction receiver 514 that can be a chip or a circuit, a flight speed receiver 515 that can be a chip or a circuit, a flight height receiver 516 that can be a chip or a circuit, a flight power receiver 517 that can be a chip or a circuit, a flap angle receiver 518 that can be a chip of a circuit, a spoiler angle receiver 519 that can be a chip or a circuit, an aileron angle receiver 524 that can be a chip or a circuit, a rudder angle receiver 520 that can be a chip or a circuit, an elevator angle receiver 521 that can be a chip or a circuit, an autopilot state receiver 525 that can be a chip or a circuit, and a weather data receiver 526 that can be a chip or a circuit. The flight direction receiver 514 serves to receive a flight direction data from, for example, a flight direction sensor on the aircraft, so that a flight direction value 814 is shown in the display unit 2 on or near the aircraft image 7. The flight speed receiver 515 serves to receive a flight speed data from, for example, a flight speed sensor on the aircraft, so that a flight speed value 815 is shown in the display unit 2 on or near the aircraft image 7. The flight height receiver 516 serves to receive a flight height data from, for example, a flight height sensor on the aircraft, so that a flight height value 816 is shown in the display unit 2 on or near the aircraft image 7. The flight power receiver 517 serves to receive a flight power data from, for example, a flight power sensor on the aircraft, so that a flight power value 817 or a reverse thrust value 827 is shown in the display unit 2 on or near the engine image 719. The flap angle receiver 518 serves to receive two flap angle data from, for example, two flap-angle sensors on the aircraft, so that two flap angle values 818 are shown in the display unit 2 on or near the flap images 713. The spoiler angle receiver 519 serves to receive two spoiler angle data from, for example, two spoiler-angle sensors on the aircraft, so that two spoiler angle values 819 are shown in the display unit 2 on or near the spoiler images 714. The aileron angle receiver 524 serves to receive two aileron angle data from, for example, two aileron-angle sensors on the aircraft, so that two aileron angle values 822 are shown in the display unit 2 on or near the two aileron images 722. The rudder angle receiver 520 serves to receive a rudder data from, for example, a rudder-angle sensor on the aircraft, so that a rudder angle value 820 is shown in the display unit 2 on or near the rudder image 716. The elevator angle receiver 521 serves to receive two elevator angle data from, for example, two elevator-angle sensors on the aircraft, so that two elevator angle values 821 are shown in the display unit 2 on or near the two elevator images 7. The autopilot state receiver 525 serves to receive an autopilot state data from, for example, an autopilot actuator on the aircraft, so that an autopilot state image 823 is shown in the display unit 2 on or near the aircraft image 7. The weather data receiver 526 serves to receive a weather data from, for example, a weather radar system on the aircraft, so that a weather state image 824 is shown in the display unit 2. With these arrangements, the pilot can quickly and correctly get more actual flight data of the aircraft to ensure further upgraded aviation safety.

Please refer to FIG. 2. As shown, according to a preferred embodiment of the present disclosure, the pitch angle value 811 can be shown on or near the fuselage image 711, the roll angle value 812 can be shown on or near the fuselage image 711, the yaw angle value 813 also can be shown on or near the fuselage image 711. Therefore, the pilot can more quickly and correctly get the actual flight data of the aircraft to ensure enhanced aviation safety.

Referring to FIG. 2. As shown, according to a preferred embodiment of the present disclosure, the pitch angle value 811 can be shown in the display unit 2 along with one or both of a pitch-angle symbol 8111 and a pitch-angle unit 8112; and the pitch-angle symbol 8111 can be image or character. The roll angle value 812 can be shown in the display unit 2 along with one or both of a roll-angle symbol 8121 and a roll-angle unit 8122; and the roll-angle symbol 8121 can be image or character. Similarly, the yaw angle value 813 can be shown in the display unit 2 along with one or both of a yaw-angle symbol 8131 and a yaw-angle unit 8132; and the yaw-angle symbol 8131 can be image or character. With these data, the pilot can be more quickly and correctly get the real flight data of the aircraft to ensure further enhanced aviation safety.

Also referring to FIG. 2. As shown, according to a preferred embodiment of the present disclosure, the flight direction value 814 can be shown on or near the fuselage image 711, the flight speed value 815 can be shown on or near the fuselage image 711, the flight height value 816 can be shown on or near the fuselage image 711, and the autopilot state image 823 also can be shown on or near the fuselage image 711. In this manner, the pilot can more quickly and correctly get the real flight data of the aircraft to ensure further upgraded aviation safety.

Please refer to FIG. 2. According to a preferred embodiment of the present disclosure, the flight direction value 814 can be shown in the display unit 2 along with one or both of a flight-direction symbol 8141 and a flight-direction unit 8142; and the flight-direction symbol 8141 can be image or character. The flight speed value 815 can be shown in the display unit 2 along with one or both of a flight-speed symbol 8151 and a flight-speed unit 8152; and the flight-speed symbol 8151 can be image or character. The flight height value 816 can be shown in the display unit 2 along with one or both of a flight-height symbol 8161 and a flight-height unit 8162; and the flight-height symbol 8161 can be image or character. The flight power value 817 can be shown in the display unit 2 along with one or both of a flight-power symbol 8171, which can be image or character, and a flight-power unit 8172, which can be power or %; and the reverse thrust 827 can be shown in the display unit 2 along with one or both of a reverse-thrust symbol 8271, which can be image or character, and a reverse-thrust unit 8272, which can be power or %. Each of the flap angle values 818 can be shown in the display unit 2 along with one or both of a flap-angle symbol 8181 and a flap-angle unit 8182; and the flap-angle symbols 8181 can be images or characters. Each of the spoiler angle values 819 can be shown in the display unit 2 along with one or both of a spoiler-angle symbol 8191 and a spoiler-angle unit 8192; and the spoiler-angle symbols 8191 can be images or characters. Each of the aileron angles 822 can be shown in the display unit 2 along with one or both of an aileron-angle symbol 8221 and an aileron-angle unit 8222; and the aileron-angle symbols 8221 can be images or characters. The rudder angle value 820 can be shown in the display unit 2 along with one or both of a rudder-angle symbol 8201 and a rudder-angle unit 8202; and the rudder-angle symbol 8201 can be image or character. Each of the elevator angle values 821 can be shown in the display unit 2 along with one or both of an elevator-angle symbol 8211 and an elevator-angle unit 8212; and the elevator-angle symbols 8211 can be images or characters. In this way, the pilot can more quickly and correctly get the real flight data of the aircraft to further upgrade the aviation safety.

Please further refer to FIG. 2. According to a preferred embodiment of the present disclosure, the aircraft image 7 includes a front landing-gear image 720 and two main landing-gear images 721; and the flight data receiver unit 5 includes a front landing-gear folding/opening receiver 522, which can be a chip or a circuit, and a main landing-gear folding/opening receiver 523, which also can be a chip or a circuit. The front landing-gear folding/opening receiver 522 serves to receive a front landing-gear folding/opening data from, for example, a front landing-gear folding/opening sensor on the aircraft, so that the front landing-gear image 720 is hidden/visible in the display unit 2, respectively. Similarly, the main landing-gear folding/opening receiver 523 serves to receive a main landing-gear folding/opening data from, for example, a main landing-gear folding/opening sensor on the aircraft, so that the main landing-gear images 721 are hidden/visible in the display unit 2, respectively. In this way, the pilot can quickly and correctly determine whether the front landing gear and the two main landing gears of the aircraft are correctly folded or opened to further upgrade the aviation safety.

Please refer to FIGS. 1 and 2. As shown, according to another preferred embodiment, the present disclosure further includes an aircraft image view-angle selection unit 9, which can be a chip or a circuit and is electrically connected to the CPU 1. With this arrangement, the pilot can use the aircraft image view-angle selection unit 9 to check the flight attitude from a top rear side (as shown in FIG. 2), a rear side, a bottom side, or other view angles of the aircraft image.

Figure 3:
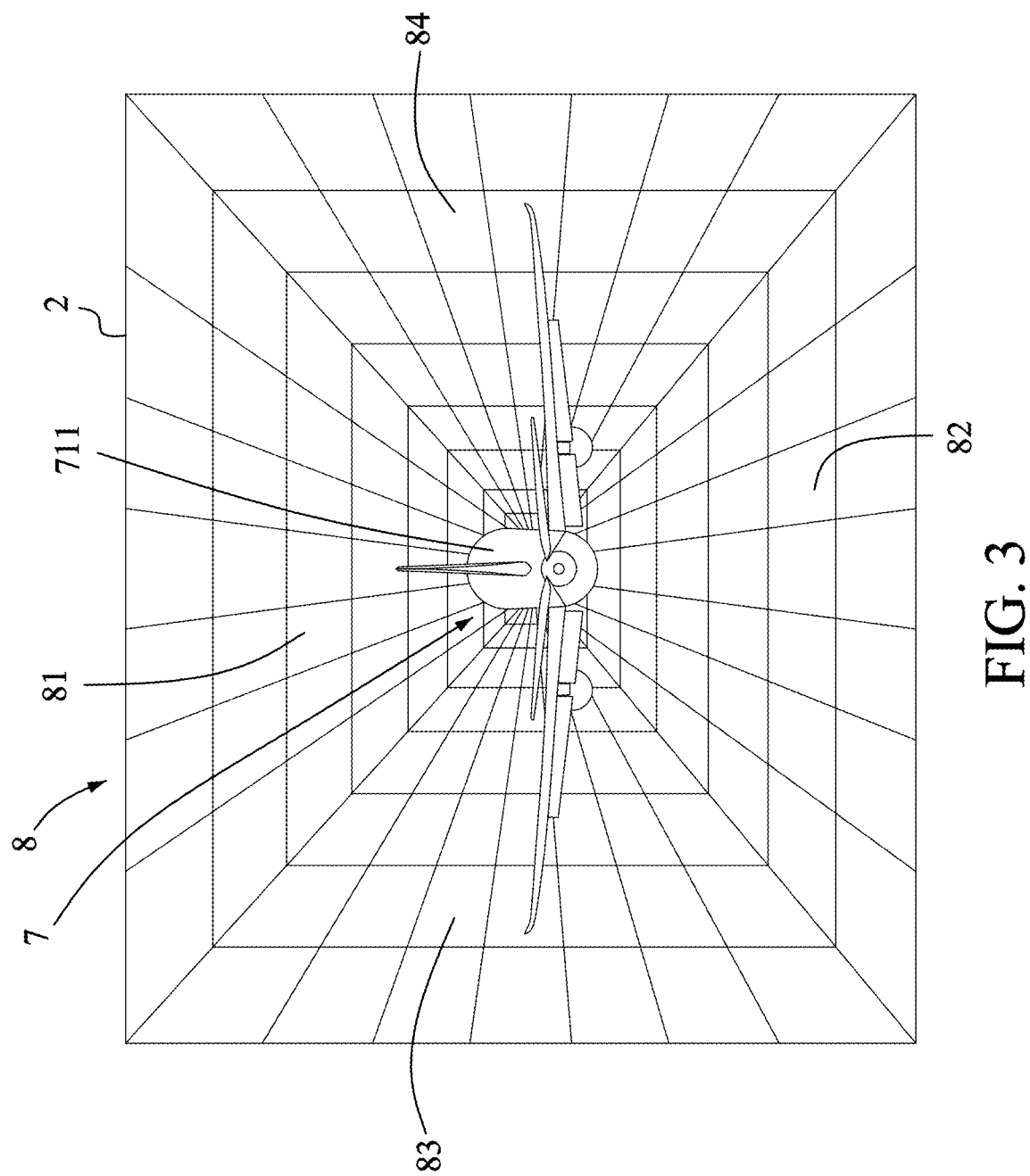
FIG. 3 is an exemplified view 1 of the display unit showing an aircraft image and a grid image according to the preferred embodiment of the present disclosure.
Figure 4:
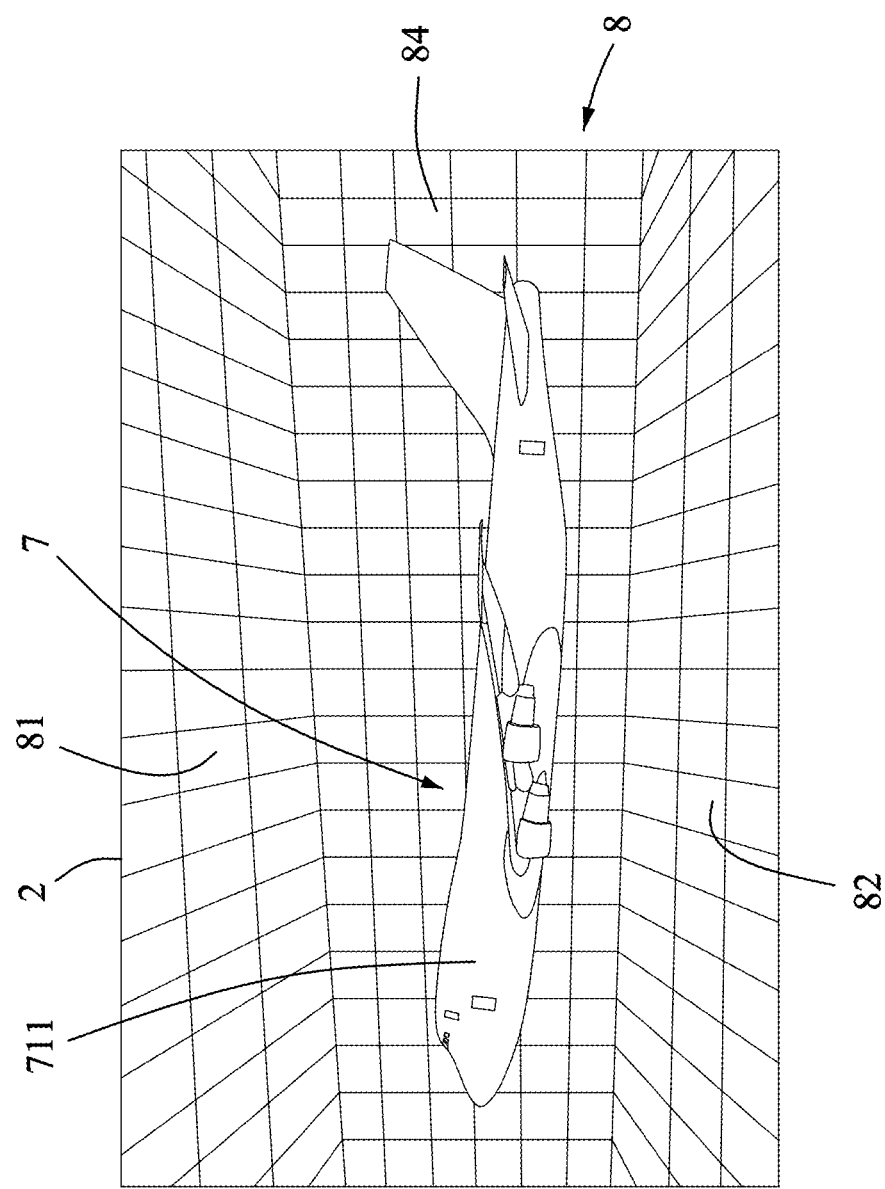
FIG. 4 is an exemplified view 2 of the display unit showing the aircraft image and the grid image according to the preferred embodiment of the present disclosure.
Figure 5:
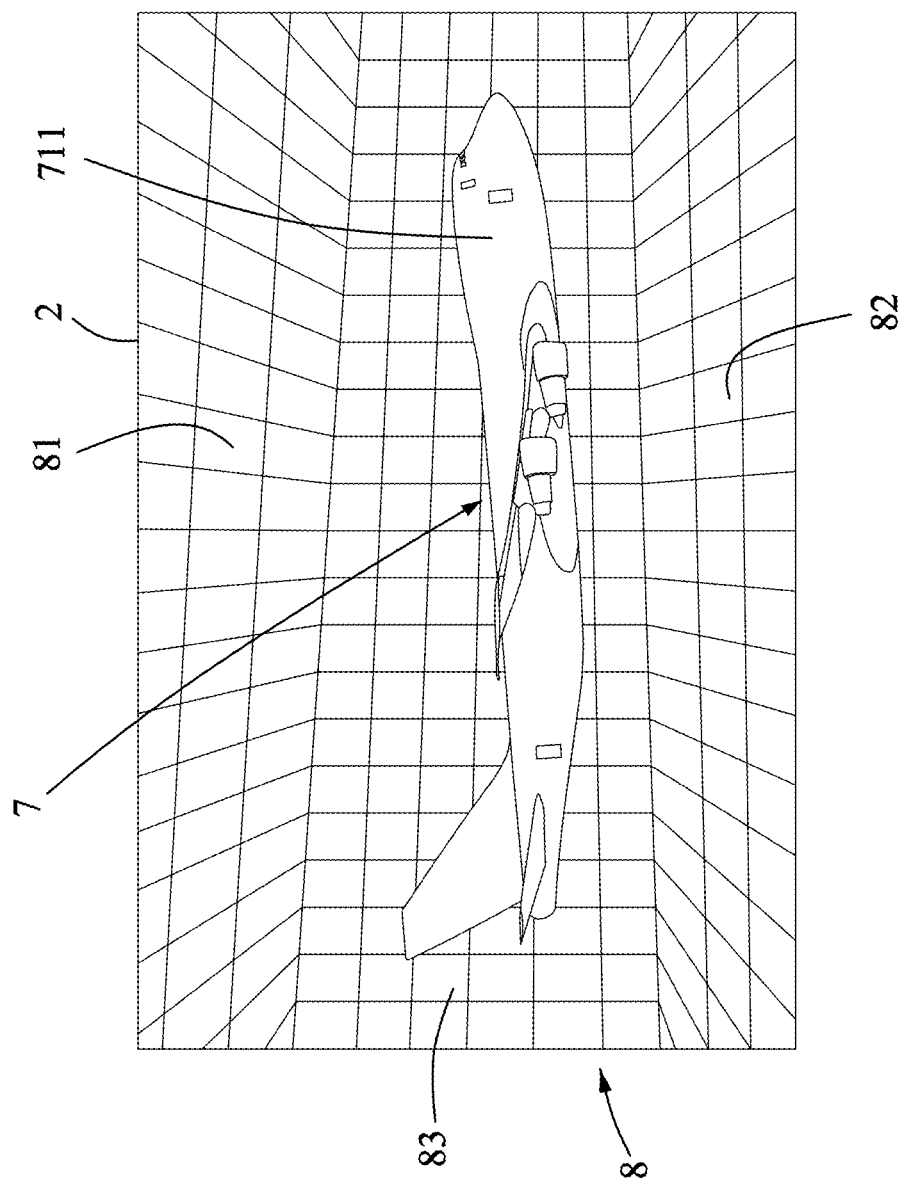
FIG. 5 is an exemplified view 3 of the display unit showing the aircraft image and the grid image according to the preferred embodiment of the present disclosure.

Please refer to FIGS. 1 and 3 to 5. As shown, the present disclosure further provides an aircraft flight attitude display device, which includes a central processing unit (CPU) 1, a display unit 2, a flight data receiver unit 5, and a power supply unit 6. The display unit 2 is electrically connected to the CPU 1 and shows an aircraft image 7 and a grid image 8 therein, the aircraft image 7 is located in the grid image 8. The grid image 8 has an upper grid face image 81 and a lower grid face image 82, the upper grid face image 81 corresponds to the sky and is above a back of the fuselage image 711, the lower grid face image 82 corresponds to the ground and is below a belly of the fuselage image 711, the aircraft image 7 may be located between the upper grid face image 81 and the lower grid face image 82. As shown in FIG. 3, from a tail of the aircraft image 7, the aircraft image 7 may be located between the upper grid face image 81 and the lower grid face image 82. As shown in FIG. 4, from a left side of the aircraft image 7, the aircraft image 7 may be located between the upper grid face image 81 and the lower grid face image 82. As shown in FIG. 5, from a right side of the aircraft image 7, the aircraft image 7 may be located between the upper grid face image 81 and the lower grid face image 82. The left and right sides between the upper grid face image 81 and the lower grid face image 82 may not be provided with grid faces, or the left and right sides between the upper grid face image 81 and the lower grid face image 82 may be respectively provided with a left grid face image 83 and a right grid face image 84 (as shown in FIG. 3). The aircraft image 7 (please refer to FIG. 2) includes a fuselage image 711, two wing images 712, two flap images 713, two spoiler images 714, two aileron images 722, a vertical stabilizer image 715, a rudder image 716, two horizontal stabilizer images 717, two elevator images 718, and at least one engine image 719. The flight data receiver unit 5 is electrically connected to the CPU 1 and includes a pitch angle receiver 511, a roll angle receiver 512, and a yaw angle receiver 513. The pitch angle receiver 511 serves to receive a pitch angle data (e.g., pitch angle value), the aircraft image 7 shown in the display unit 2 is in a flight attitude corresponding to the pitch angle data; the roll angle receiver 512 serves to receive a roll angle data (e.g., roll angle value), the aircraft image 7 shown in the display unit 2 is in a flight attitude corresponding to the roll angle data; the yaw angle receiver 513 serves to receive a yaw angle data (e.g., yaw angle value), the aircraft image 7 shown in the display unit 2 is in a flight attitude corresponding to the yaw angle data. The power supply unit 6 is electrically connected to the CPU 1 for supplying necessary power to all units included in the aircraft flight attitude display device of the present disclosure. The remaining description of the present embodiment may refer to the previous embodiment, which will not be repeated herein.

As described above, the aircraft flight attitude display device of the present disclosure includes the display unit 2 for showing the aircraft image 7 that indicates the actual flight attitudes of the aircraft, including take-off, landing, sideward flight, rolling, etc., and the assistance of the upper grid face image 81 and the lower grid face image 82, so that a pilot can quickly and correctly judge the flight attitude of the aircraft relative to the sky and the ground and correctly operates the aircraft to ensure upgraded aviation safety. For example, when a nose of the aircraft image 7 suddenly moves towards the lower grid face image 82, the pilot can quickly and correctly judge to pull up the nose of the aircraft to avoid the aircraft hitting the ground. When the nose of the aircraft image 7 suddenly moves towards the upper grid face image 81, the pilot can quickly and correctly judge the nose to lower the aircraft to avoid stalling the aircraft.

Further, in the above embodiment, the upper grid face image 81 and the lower grid face image 82 may respectively have different colors, so that the pilot can quickly identify the upper grid face image 81 and the lower grid face image 82.

Please refer to FIGS. 3 to 5. As shown, in the above embodiment, the grid image 8 may further have a left grid face image 83 and a right grid face image 84. As shown in FIG. 3, the upper grid face image 81, the lower grid face image 82, the left grid face image 83 and the right grid face image 84 may indicate a correct flight direction of the aircraft. When the nose of the aircraft image 7 moves towards the left grid face image 83, the pilot can quickly and correctly judge to pull the nose of the aircraft back to the right so that the aircraft can be oriented in the correct flight direction. When the nose of the aircraft image 7 moves towards the right grid face image 84, the pilot can quickly and correctly judge to pull the nose of the aircraft back to the left so that the aircraft can be oriented in the correct flight direction.

Please refer to FIGS. 3 to 5. As shown, in the above embodiment, the left grid face image 83 and the right grid face image 84 may respectively have different colors, so that the pilot can quickly identify the left grid face image 83 and the right grid face image 84.

While the present disclosure has been described by means of specific embodiments, numerous modifications and variations could be made thereto by those skilled in the art without departing from the scope and spirit of the present disclosure as set forth in the claims.

What is claimed is:

1. An aircraft flight attitude display device, comprising:
a central processing unit (CPU);
a display unit being electrically connected to the CPU for showing an aircraft image and a grid image therein, the aircraft image is located in the grid image; the aircraft image including a fuselage image, two wing images, two flap images, two spoiler images, two aileron images, a vertical stabilizer image, a rudder image, two horizontal stabilizer images, two elevator images and at least one engine image, the grid image has an upper grid face image and a lower grid face image, the upper grid face image corresponds to the sky and is above a back of the fuselage image, the lower grid face image corresponds to the ground and is below a belly of the fuselage image;

a flight data receiver unit being electrically connected to the CPU and including a pitch angle receiver, a roll angle receiver and a yaw angle receiver; the pitch angle receiver serving to receive a pitch angle data, so that the aircraft image shown in the display unit being in a flight attitude corresponding to the pitch angle data; the roll angle receiver serving to receive a roll angle data, so that the aircraft image shown in the display unit being in a flight attitude corresponding to the roll angle data; and the yaw angle receiver serving to receive a yaw angle data, so that the aircraft image shown in the display unit being in a flight attitude corresponding to the yaw angle data; and a power supply unit being electrically connected to the CPU, wherein the grid image has a left grid face image and a right grid face image, the upper grid face image is perpendicular to the left grid face image and the right grid face image, and the lower grid face image is perpendicular to the left grid face image and the right grid face image, and wherein each of the upper grid face image, the lower grid face image, the left grid face image and the right grid face image includes a plurality of rectangular grids.

2. The aircraft flight attitude display device according to claim 1, wherein the upper grid face image and the lower grid face image respectively have different colors.

* * * * *